United States Patent [19]

Fucito

[11] 3,794,907

[45] Feb. 26, 1974

[54] CONVERTER CIRCUIT

[75] Inventor: Dermot Thomas Fucito, Fairport, N.Y.

[73] Assignee: Stromberg-Carlson Corporation, Rochester, N.Y.

[22] Filed: Sept. 7, 1972

[21] Appl. No.: 287,140

[52] U.S. Cl. .................. 321/16, 321/45 R, 331/75, 331/113 R

[51] Int. Cl. .......................................... H02m 7/52

[58] Field of Search......321/16, 18, 45 R; 331/75, 331/114

[56] References Cited

UNITED STATES PATENTS

| | | | |
|---|---|---|---|
| 3,435,324 | 3/1969 | Bishop | 321/45 R |
| 3,257,604 | 6/1966 | Colclaser et al. | 321/45 R |
| 3,330,970 | 7/1967 | Wennerberg et al. | 321/16 X |

*Primary Examiner*—A. D. Pellinen

*Attorney, Agent, or Firm*—Charles C. Krawczyk; William F. Porter, Jr.

[57] ABSTRACT

An oscillator driven converter circuit with a push pull power output stage including a regenerative feedback circuit wherein the signals from an oscillator circuit are applied to the power output stage so that the regenerative feedback circuit provides the switching current for the push pull power stage, under the control of, and at the frequency of, the oscillator signals.

12 Claims, 3 Drawing Figures

CONVERTER CIRCUIT

BACKGROUND OF THE INVENTION

This invention pertains to converter circuits in general and in particular to oscillator driven converter circuits.

Converters are employed to convert low level DC voltages to high level AC voltages, which in turn can be filtered to provide a high level DC voltage. These converters are of particular interest wherein high voltages are required to be produced from low voltage power sources and for isolation between a power source and load. One type of converter circuit comprises a transformer coupled oscillator circuit. Such transformer coupled converter circuits require a small number of parts and are efficient running circuits. However, these converter circuits are noisy in operation, present problems in starting and frequency control, and require expensive multiwinding saturating transformers. Another type of converter circuit is the oscillator driven type wherein an oscillator drives a power switching stage. Such converter circuits provide good frequency control, generate less noise, and exhibit no starting problems. However, the oscillator driven type converter circuits of the prior art require transformer coupling, are inefficient to operate, generate excessive heat, and require expensive high power components to provide the necessary drive to switch the power output stage.

It is therefore an object of this invention to provide a new and improved converter circuit.

It is another object of this invention to provide a new and improved oscillator driven converter circuit.

It is a further object of this invention to provide a new and improved oscillator driven converter circuit that is more efficient than the oscillator driven converter circuits of the prior art.

It is also an object of this invention to provide new and improved oscillator driven converter circuit having resistance-capacitance (R-C) drive circuit and that provides efficient operation.

BRIEF DESCRIPTION OF THE INVENTION

An oscillator driven converter circuit including an output push pull stage having a regenerative feedback circuit means. Periodic switching signals are applied to the push pull stage so that, in response to the switching signals, the regenerative feedback circuit means provides the drive signals for switching the push pull output stage at a rate that is a function of the frequency of the switching signals.

In accordance with a feature of the invention, the regenerative feedback circuit provides the high level power drive signals needed to rapidly switch the push pull devices into and out of saturation. When transistors are employed as the push pull devices, the regenerative feedback circuit provides the forward and reverse base current drive. The periodic switching signals to the push pull stage merely provides enough signal power to initiate the switching action and to maintain the circuit switched between cycles. The arrangement is such that the regenerative feedback circuit means provides the power for switching the push pull stage thereby allowing direct current (resistive) coupling of the drive circuit to the push pull stage without excessive power dissipation and thereby greatly increasing the efficiency of the converter circuit and reducing its expense.

In accordance with the further feature of the invention, the periodic switching signals applied to the push pull stage include a deadband of the predetermined duration between half cycles of the signals wherein no drive signal is present. This assures that no drive signal is present at the conducting push pull device when the regenerative action occurs, which in turn increases the efficiency of the converter circuit.

A still further feature of the invention includes circuit means for controlling the degree in which the push pull devices are driven into saturation to further reduce noise spike generation.

DESCRIPTION OF THE PREFERRED EMBODIMENT OF THE INVENTION

Figure 1:
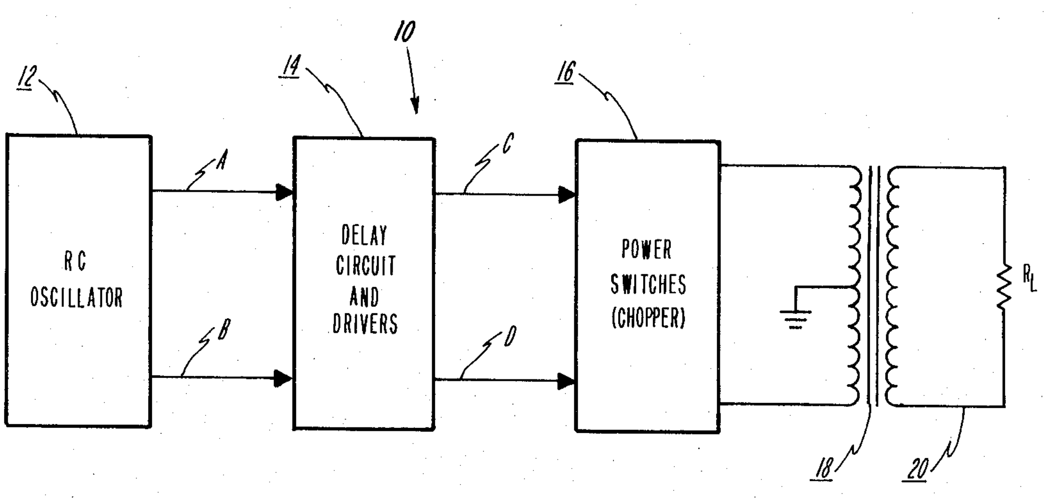
FIG. 1 is a block diagram of a converter circuit made in accordance with the teachings of this invention.

Referring now to FIG. 1, there is shown a functional block diagram of a converter circuit 10 made in accordance with the teachings of this invention. The converter 10 comprises three stages, an oscillator stage 12, a driver stage 14, and a power switching stage 16 driving an output transformer 18 which is connected to a load $R_l$ over a line 20.

Figure 2:
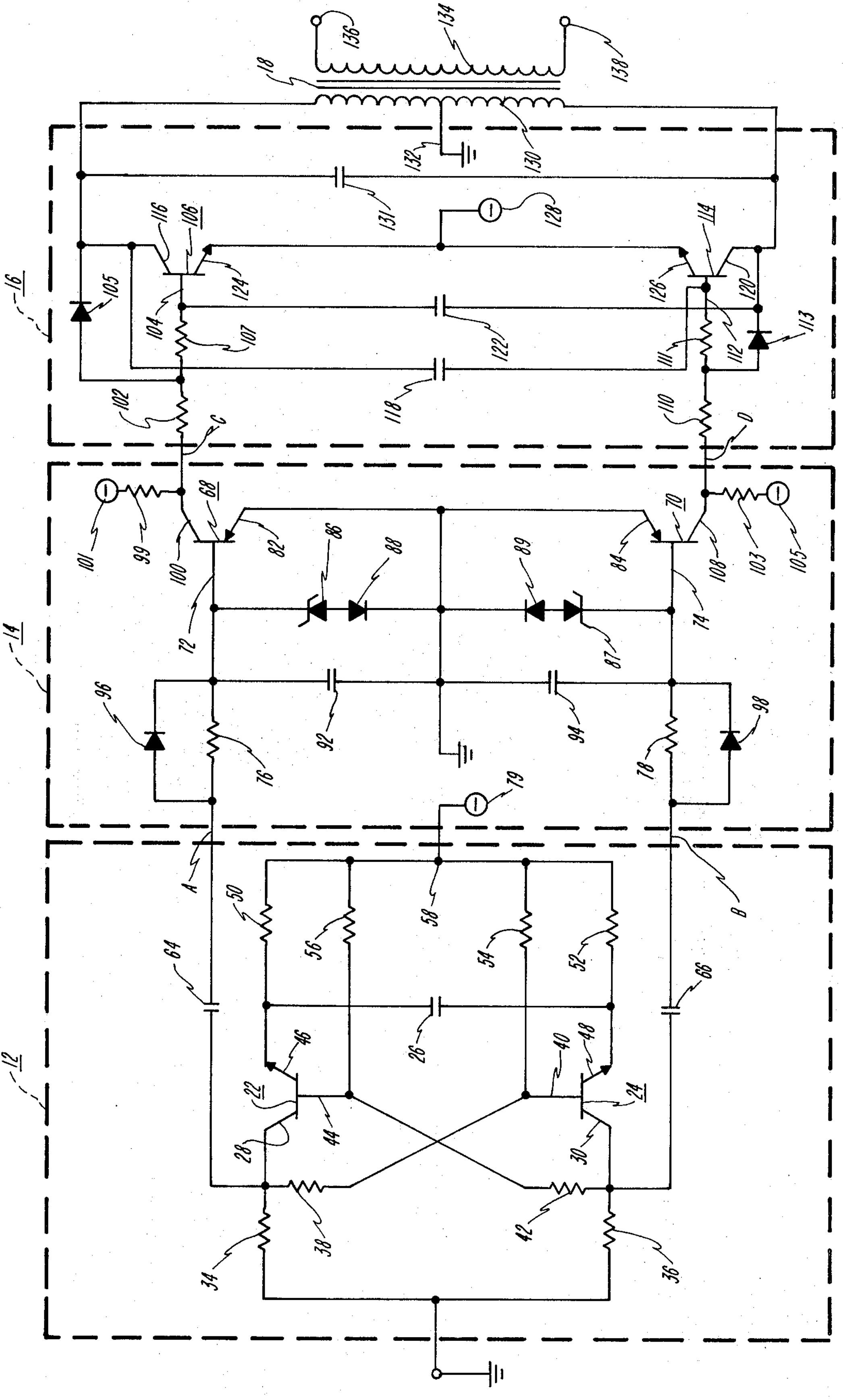
FIG. 2 is an electrical schematic of the converter circuit of FIG. 1.

With reference to FIG. 2, an R-C oscillator, or multivibrator, stage 12 is a non-saturating current mode type oscillator. The oscillator stage comprises two transistors 22 and 24 and a single timing capacitor 26. The collectors 28 and 30 of the respective transistors 22 and 24 are connected to a ground through resistors 34 and 36, respectively. The collector 28 is also connected through a resistor 38 to the base 40 of the transistor 24. The collector 30 is also connected through a resistor 42 to the base 44 of the transistor 22. The capacitor 26 is connected between the emitters 46 and 48 of the respective transistors 22 and 24. The emitters 46 and 48 and the bases 40 and 44 are each connected through respective resistors 50, 52, 54 and 56 to a negative power supply terminal 58. The collectors 28 and 30 are also AC coupled to the driver stage 14 via respective capacitors 64 and 66. The R-C oscillator 12 is symmetrical in design and provides a square output (waveforms A and B of FIG. 3) at the collectors 28 and 30 of the respective transistors 22 and 24, wave-forms of which are 180° out-of-phase with each other. The non-saturating current mode oscillator 12 has the advantage of assured oscillation when the power is applied thereto.

A biasing resistor 76 and a shunt diode 96 are connected between the base 72 of a driver transistor 68 and the capacitor 64. A biasing resistor 78 and a shunt diode 98 are connected between the base 74 of a driver transistor 70 and the capacitor 66. The emitters 82 and 84 of the respective driver transistors 68 and 70 are connected to ground. A first series circuit including a zener diode 86 and a diode 88 is connected between the base 72 of the driver transistor 68 and the emitter 82. A second series circuit including a zener diode 87 and diode 89 is connected between the base 74 and the emitter 84 of the transistor 70. The diodes 88 and 89 are so arranged as to prevent forward conduction of the respective zener diodes 86 and 87, thereby preventing shunting the base currents to the transistors 68 and 70. The series circuits including the zener diodes 86 and 87 and the diodes 88 and 89 provide a clamping action to control the base drive voltage level that can be applied to the transistors 68 and 70. The capacitors 92 and 94 are connected in parallel with the respective first and second series circuits.

The diode 96, the resistor 76 and the capacitor 92 provide a delaying action for the base drive for the transistor 68, likewise, the diode 98, the resistor 78 and the capacitor 94 provide delaying action for the base drive for the transistor 70. When the transistors 68 and 70 are to be turned off, the polarity of the drive signals from the oscillator 12 is in a direction to forward bias the respective diodes 96 and 98 to bypass their shunt resistors 76 and 78 and provide a short time R-C time constant for the circuits of the capacitors 92 and 94. On the other hand when the transistors 68 and 70 are to be turned on, the polarity of the drive signal is such that the diodes 96 and 98 are reverse biased and their respective resistors 76 and 78 are included in the time constant of the circuit for the capacitors 92 and 94. Hence, the "turn off" time of the oscillator 68 and 70 closely follows the switching action of the oscillator 12, while the "turn on" time is delayed due to the added time constant of the resistors 76 and 78.

The transistors 68 and 70 are connected to apply drive signals to the switching stage 16 including a pair of switching transistors connected in a push pull circuit with regenerative feedback. The collector 100 of the driver transistor 68 is connected through current limiting resistors 102 and 107 to the base 104 of the transistor 106. The collector 100 is also connected to negative power supply terminal 101 via resistor 99. In a similar manner, the collector 108 of the driver transistor 70 is connected through current limiting resistors 110, 111 to the base 112 of the transistor 114. The collector 108 is also connected to negative power supply terminal 105 via a resistor 103. The connection of the collectors 100 and 108 to negative battery via the resistors 99 and 103, respectively, provide additional assurance that when the drive signals are removed, the transistors 106 and 114 are positively cut off by reducing any leakage currents. The base and collectors of the two switching transistors 106 and 114 are cross-coupled to each other via capacitors 118 and 122 to provide a regenerative feedback circuit. The emitters 124 and 126 are connected to negative power supply terminal 128. The collectors 116 and 120 of the transistors 106 and 114 are connected to opposite ends of the primary winding 130 of the transformer 18. The primary winding 130 has a center tap 132 connected to ground. The primary winding 128 is preferably a bifilar winding. A capacitor 131 is connected across the primary winding 130 to suppress high frequency oscillation. The secondary winding 134 is connected to a pair of output terminals 136 and 138 for connection to a load (not shown). The number of primary and secondary turns in the transformer 18 is determined by the output voltage and current requirements. The drive signals from the transistors 68 and 70 and regenerative feedback circuit provides an arrangement for rapidly switching the transistors 106 and 114 into cut off and saturation in a push pull fashion.

Figure 3:
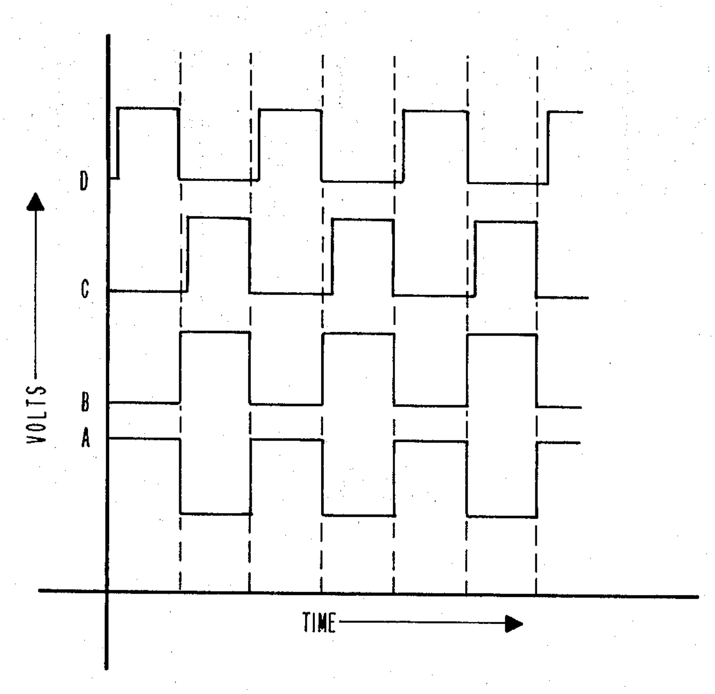
FIG. 3 is a diagram of the waveforms at various locations within the converter circuit of FIGS. 1 and 2.

The output of the oscillator 12 is a symmetrical waveform as illustrated in FIG. 3 for leads A and B of FIGS. 1 and 2 (interconnecting the oscillator, with the driver stage 14). The output of the multivibrator stage 12 is delayed by the driver stage as illustrated in FIG. 3 for the leads C and D, of FIGS. 1 and 2 interconnecting the drivers stage 14 and the power switching stage 16.

The delay action of the driver circuit 14 provides a "deadband" between half cycles of the oscillator signals, wherein for a preset period of time, no drive current is provided to either of the switching transistors 106 and 114. This is to assure that no drive signal is present at the base of the switching transistor that is in a conducting state and is to be cut off. For example, it can be assumed that the transistor 106 is conducting while the transistor 114 is cut off. When the oscillator signal is switched, the delay action of the driver circuit functions to remove the drive signal from the transistor 106 prior to applying the drive signal to the transistor 114. Therefore, just prior to switching there is no drive signal present at the base of either transistor 106 or 114. When the delay period is over, the drive signal is applied to the transistor 114 causing it to conduct and initiate a regenerative feedback action. The capacitor 122, which is charged to approximately the supply voltage, starts to discharge through transistor 114 and the emitter-base junction of transistor 106, thus driving out the stored charge in transistor 106 and turning it off. Capacitor 118, which is initially discharged, will charge up to the approximate supply voltage through the emitter-base junction of transistor 114, thus increasing its conduction. The capacitor 122 now discharges more quickly through transistor 114 thereby speeding up the turn-off of transistor 106. This constitutes the regenerative switching action between the power switching transistors. The forward base current through the driver transistors 68 and 70 is fast enough to initiate and maintain the switched state. By removing the forward base current from the conducting transistor prior to turning on the nonconducting transistor, prevention of base storage charge accumulation is accomplished. That is, the stored base charge of the conducting transistor is completely removed during the regenerative switching period caused by cross-coupling capacitors 118 and 122. If the base current is present during or after the regenerative switching action, all of the base charge will not be driven out. The transistor will remain conducting for an extended time causing additional heating of the device, which will in turn, cause additional base charge to accumulate and a possible thermal runaway condition may exist due to accumulation of stored charge, resulting in transistor failure.

The switching noise spikes generated in the output stage are reduced by the use of the resistors 107 and 111 and their respective diodes 105 and 113. The diodes 105 and 113 provide a clamping circuit for limiting the amount of potential drop that can be developed between the base and collector junction of the transistors 106 and 114, respectively, while the resistors 107 and 111 limit the degree to which transistors 106 and 114 can be driven into saturation. This arrangement further reduces the storage charges in the transistors due to saturation and thereby provides more efficient switching action with less noise.

Th regenerative feedback action of the capacitors 118 and 122 provides the high current drive necessary for switching the transistors 106 and 114 into and out of conduction at a very rapid rate. Under this arrangement, the driver circuit 14 of the invention need merely provide the switching signal (delayed as previously mentioned) to initiate the switching action, and once switched, to maintain the transistors 106 and 114 in the saturated and cut off conditions for the remaining one-half cycle of the oscillator signal. Hence, it can be seen that the regenerative feedback circuit provides the high current power necessary to rapidly switch the power transistors between cut off and saturation and that the driver circuit need merely provide the much lower amount of current necessary to control and maintain the switching action. This arrangement provides the advantage of being able to use direct resistor coupling between the driver stage 14 and the push pull output stage 16 without the need for high power components, or without being required to use transformer coupling, to provide the large drive current requirements needed to rapidly switch such push pull output stages (without regenerative feedback).

The oscillator driven converter circuit of the invention has the advantage of utilizing the low level R-C master oscillator circuit for controlling the switching frequency, thus providing a reliable starting arrangement for the converter circuit.

The high speed operation and excellent circuit efficiency is made possible by the regenerative switching action of the push pull action stage. For example, with the power transistor 106 and 114 switching a one ampere reflected load, less than 500 nanosecond rise and fall times in the drive signals are experienced. Furthermore, the feedback circiut in the power stage eliminates the inefficiency experienced by brute force R-C driving circuits since the driver circuit need not provide the high "turn on" current or "reverse turn off" current needed to assure fast switching of power transistors with direct coupling. At a 22 kilohertz frequency of operation, it was found that a delay or deadband in the base drive to the transistors 106 and 114 in the order of 5 microseconds was sufficient to assure that the base drive to the conducting transistor was removed prior to switching. This delay as a by-product improves efficiency because of the total absence of base current during this delay period. The efficiency of the converter circuit of the invention was found to be in the order of 90 percent.

What is claimed is:

1. A converter circuit comprising:

oscillator circuit means for providing periodic oscillatory signals;

a push pull output stage having first and second input lines and first and second output lines and including a regenerative feedback circuit connected between said first output line and said second input line and between said second output line and said first input line, and driver circuit means for applying drive signals from said oscillator circuit means to said first and second input lines of said push pull output stage, said push pull output stage having output signals over the said first and second output lines, respectively, so that said regenerative feedback circuit thereby provides the drive signal for switching said push pull output stage and the drive signals thereby control the frequency at which the push pull output stage is switched.

2. A converter circuit as defined in claim 1 wherein:

said driver circuit means provides two alternating drive signals at said oscillator frequency that are 180° out-of-phase and which include a spacing between alternative drive signals wherein zero drive signal is present.

3. A converter circuit as defined in claim 1 wherein:

said push pull stage includes a pair of transistors connected in a push pull arrangement and each being connected between corresponding input and output lines to drive an output transformer and wherein a base of each transistor is connected to receive a separate one of said drive signals over one of said input lines, and said regenerative feedback circuit is connected to the pair of transistors so that a drive signal applied to the base of one transistor will initiate a feedback action from the output line connected to said one transistor to cause said one transistor to be saturated and the other cut off.

4. A converter circuit as defined in claim 3 wherein:

said feedback circuit includes a first capacitance circuit means connected between the collector of a first transistor of said pair and the base of the second transistor of said pair, and a second capacitance circuit means connected between the collector of the second transistor and the base of the first transistor.

5. A converter circuit comprising:

oscillator circuit means for providing periodic oscillatory signals;

a push pull output stage including a pair of transistors connected in push pull arrangement to drive an output transformer, the base of each of said transistors being connected to receive separate drive signals and including a regenerative feedback circuit including a first capacitance circuit means connected between the collector of a first transistor of said pair and the base of said second transistor of said pair and a second capacitance circuit means connected between the collector of said second transistor and the base of said first transistor so that a drive signal applied to the base of one transistor will initiate a feedback action to cause said one transistor to be saturated and the other transistor to be cut off, and driver circuit means for applying drive signals from said oscillator circuit means to said push pull output stage so that said regenerative feedback circuit provides the drive signal for switching said push pull output stage and the drive signals control the frequency at which the push pull output stage is switched.

6. A converter circuit as defined in claim 5 wherein:

said driver circuit includes two transistors, each transistor being directly coupled to drive a separate one of said pair of push pull transistors in a push pull fashion, said driver transistors being driven in a push pull manner by said oscillator circuit signals, and driver circuit includes delay circuit means connected between said oscillator circuit and said driver transistors for delaying the conduction of said driver transistor a preset period of time after receiving the oscillator signals.

7. A converter circuit as defined in claim 6 wherein said delay circuit means includes:

separate resistor-capacitor series circuit with a diode in parallel with the resistor, for each driver circuit transistor, and circuit means for connecting said series circuits between said oscillator and said driver transistors so that when the oscillator circuit signal is of a polarity to render a driver transistor conductive, the diode is reverse biased so that a delayed switching signal is applied to the driver transistor that is a function of the R-C time constant of the resistor-capacitance circuit, and when the oscillator circuit signal is of a polarity to render the driver transistor nonconductive said diode is forward biased to shunt said resistor.

8. A converter circuit as defined in claim 5 including:

circuit means connected to each of said first and second transistors for controlling the degree that said first and second transistors are driven into saturation in response to the drive signals.

9. A converter circuit comprising:

oscillator circuit means for providing a source of periodic switching signals;

a power switching stage including a pair of semiconductor switching devices each of said switching devices having an input electrode and an output electrode and being connected to drive an output transformer in a push pull configuration and including a regenerative feedback circuit connected between the output electrode of each of said switching devices and the input electrode of the other of said switching devices and being responsive to 180° out-of-phase switching signals applied to said semiconductor devices for switching said semiconductors between saturation and cut off, and circuit means receiving said periodic signals from said oscillator circuit means and applying said out-of-phase signals to said switching devices, said circuit means including a delay circuit for providing a deadband between said out-of-phase signals of a predetermined duration so that the switching action of said semiconductor devices is initiated by said out-of-phase signals and whereby said regenerative circuit reinforces said out-of-phase signals to provide rapid switching of said semiconductor devices between saturation and cut off at a periodic switching rate that is a function of said periodic switching signal.

10. A converter circuit as defined in claim 9 including:

circuit means for controlling the degree said semiconductor devices are driven into saturation in response to the out-of-phase signal.

11. A converter circuit comprising:

means for providing periodic switching signals;

an output switching circuit including a pair of semiconductor devices connected to a transformer in a push pull circuit configuration and each including an input electrode and an output electrode;

regenerative feedback circuit means connected between the output electrode of each semiconductor device and the input electrode of the other semiconductor device, so that when a drive signal is applied to one of said devices, said one device is driven into saturation while the other device is cut off, and driver circuit means connected between said pair of semiconductor means in said switching circuit for providing periodic switching signals to said switching stage at a frequency corresponding to said periodic signals and having a deadband between half cycles of said drive signals of a predetermined duration.

12. A converter circuit comprising:

oscillator circuit means for providing oscillatory signals;

a push pull output stage including a pair of switching circuits connected to drive a transformer and a regenerative feedback circuit connected between the output of each of said switching circuits and the input of the other of said switching circuits, and circuit means for applying said oscillatory signals to said switching circuit in said push pull output stage, including a delay circuit, so that a deadband is present for a preset period of time between half cycles of the oscillatory signals, wherein said regenerative feedback circuit in response to said oscillatory signals provides the drive signals for reversing the state of conduction of the two switching circuits, and wherein the oscillatory signals control the frequency at which the stages are switched.

* * * * *